United States Patent [19]
Alexander, III et al.

[11] Patent Number: 6,002,872
[45] Date of Patent: Dec. 14, 1999

[54] METHOD AND APPARATUS FOR STRUCTURED PROFILING OF DATA PROCESSING SYSTEMS AND APPLICATIONS

[75] Inventors: William Preston Alexander, III; Robert Francis Berry, both of Austin; Donald L. Mulvey, Round Rock; Robert John Urquhart, Austin, all of Tex.

[73] Assignee: International Machines Corporation, Armonk, N.Y.

[21] Appl. No.: 09/052,329

[22] Filed: Mar. 31, 1998

[51] Int. Cl.⁶ .................................. G06F 7/00; G06F 9/40
[52] U.S. Cl. .............................. 395/704; 714/47; 714/39; 714/38; 714/25; 714/27; 702/182; 702/183; 702/179; 707/3
[58] Field of Search ...................................... 395/704, 708; 714/47, 39, 38, 25, 27; 702/182, 183, 186, 179; 707/3

[56] References Cited

U.S. PATENT DOCUMENTS

| | | | |
|---|---|---|---|
| 3,916,387 | 10/1975 | Woodrum | 707/3 |
| 5,355,487 | 10/1994 | Keller et al. | 395/704 |
| 5,696,701 | 12/1997 | Burgess et al. | 714/25 |
| 5,732,272 | 3/1998 | Gochee | 395/704 |
| 5,774,729 | 6/1998 | Carney et al. | 395/707 |
| 5,828,883 | 10/1998 | Hall | 395/704 |
| 5,889,993 | 3/1999 | Kroeger et al. | 395/704 |
| 5,911,060 | 6/1999 | Elliott | 707/200 |

OTHER PUBLICATIONS

Chiou et al, "Efficient global event predicate detection," Proceedings of the 14th International Conference on Distributed Computing Systems, pp. 642–649, Jun. 1994.

Matthew Reilly, "Presentation tools for performance visualization: the M31 instrumentation experience," Proceedings of the Twenty–Third Annual Hawaii International Conference on System Sciences, vol. 1, pp. 307–313, Jan. 1990.

IBM Technical Disclosure Bulletin, "Method for Correlating Graphical Data on An Interactive Display," vol. 21, No. 11, pp. 4658–4659, Apr. 1979.

*Primary Examiner*—Tariq R. Hafiz
*Assistant Examiner*—Tuan Q. Dam
*Attorney, Agent, or Firm*—Duke W. Yee; Carstens, Yee & Cahoon; Jeffrey S. LaBaw, IBM

[57] ABSTRACT

A method for monitoring performance of a program. A periodically occurring event is detected and a stack associated with the program is identified in response to a detection of the periodically occurring event, which may be a timer interrupt. The stack is examined to identify each routine (and specific invocation point, or offset) that is currently executing in association with the program. Each routine (and offset) is represented as a node in a tree structure.

23 Claims, 8 Drawing Sheets

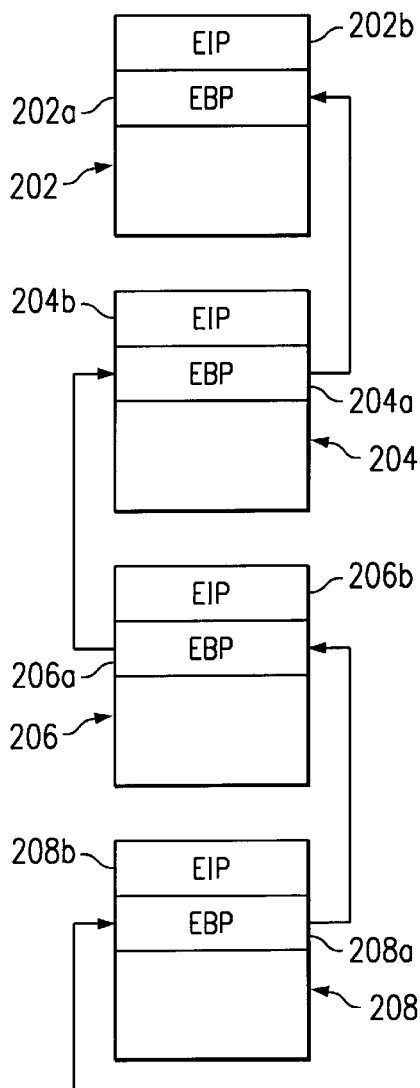

| TIMESTAMP | EVENT | CALL STACK AFTER EVENT |
|---|---|---|
| 0 | ENTER C | C |
| 1 | ENTER A | CA |
| 2 | ENTER B | CAB |
| 3 | RETURN FROM B | CA |
| 4 | ENTER B | CAB |
| 5 | ENTER B | CABB |
| 6 | RETURN FROM B | CAB |
| 7 | RETURN FROM B | CA |
| 8 | RETURN FROM A | C |
| 9 | ENTER B | CB |
| 10 | ENTER A | CBA |
| 11 | ENTER B | CBAB |
| 12 | ENTER A | CBABA |
| 13 | RETURN FROM A | CBAB |
| 14 | RETURN FROM B | CBA |
| 15 | ENTER X | CBAX |
| 16 | RETURN FROM X | CBA |
| 17 | RETURN FROM A | CB |
| 18 | RETURN FROM B | C |
| 19 | RETURN FROM C | |

FIG. 4B

| SAMPLE | CALL STACK @ SAMPLE |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |

| SAMPLE NUMBER | CALL STACK |
|---|---|
| 1 | MAIN\|X()\|a()\|f3() |
| 2 | MAIN\|Y()\|a()\|f4() |
| 3 | MAIN\|X()\|b()\|a()\|f3() |
| 4 | MAIN\|X()\|Y()\|a()\|f0() |

| SAMPLE | CALLS | BASE | CUM | NAME |
|---|---|---|---|---|
| 1 | 1 | 0 | 19 | pt_plt.tid |
| 2 | 1 | 3 | 19 | C |
| 3 | 3 | 7 | 14 | A |
| 4 | 5 | 8 | 13 | B |
| 5 | 1 | 1 | 1 | X |

FIG. 10  1000

ARCFLOW OUTPUT

BASE - TIME/INSTRUCTIONS DIRECTLY IN FUNCTION
    CUM - TIME/INSTRUCTIONS DIRECTLY AND INDIRECTLY IN FUNCTION

ARCFLOW INVARIANTS:
1) SUM (PARENT (CALLS)) = SELF (CALLS)
2) SUM (PARENT (BASE))  = SELF (BASE)
3) SUM (PARENT (CUM))   = SELF (CUM)
4) SUM (CHILD (CUM))    = SELF (CUM) - SELF (BASE)

| SOURCE | CALLS | BASE | CUM | FUNCTION |
|---|---|---|---|---|
| SELF | 1 | 0 | 19 | [0] pt_pidtid |
| CHILD | 1 | 3 | 19 | C |
| PARENT | 1 | 3 | 19 | pt_pidtid |
| SELF | 1 | 3 | 19 | [1] C |
| CHILD | 1 | 2 | 9 | B |
| CHILD | 1 | 3 | 7 | A |
| PARENT | 1 | 3 | 7 | C |
| PARENT | 1 | 3 | 7 | B |
| rPARENT | 1 | 1 | 1 | B |
| SELF | 3 | 7 | 14 | [2] A |
|  |  |  | 15 |  |
| CHILD | 3 | 5 | 7 | B |
| CHILD | 1 | 1 | 1 | X |
| PARENT | 2 | 3 | 4 | A |
| rPARENT | 1 | 2 | 3 | A |
| PARENT | 1 | 2 | 9 | C |
| SELF | 5 | 8 | 13 | [3] B |
|  |  |  | 17 |  |
| CHILD | 1 | 3 | 7 | A |
| rCHILD | 1 | 1 | 1 | A |
| CHILD | 1 | 1 | 1 | B |
| PARENT | 1 | 1 | 1 | A |
| SELF | 1 | 1 | 1 | [4] X |

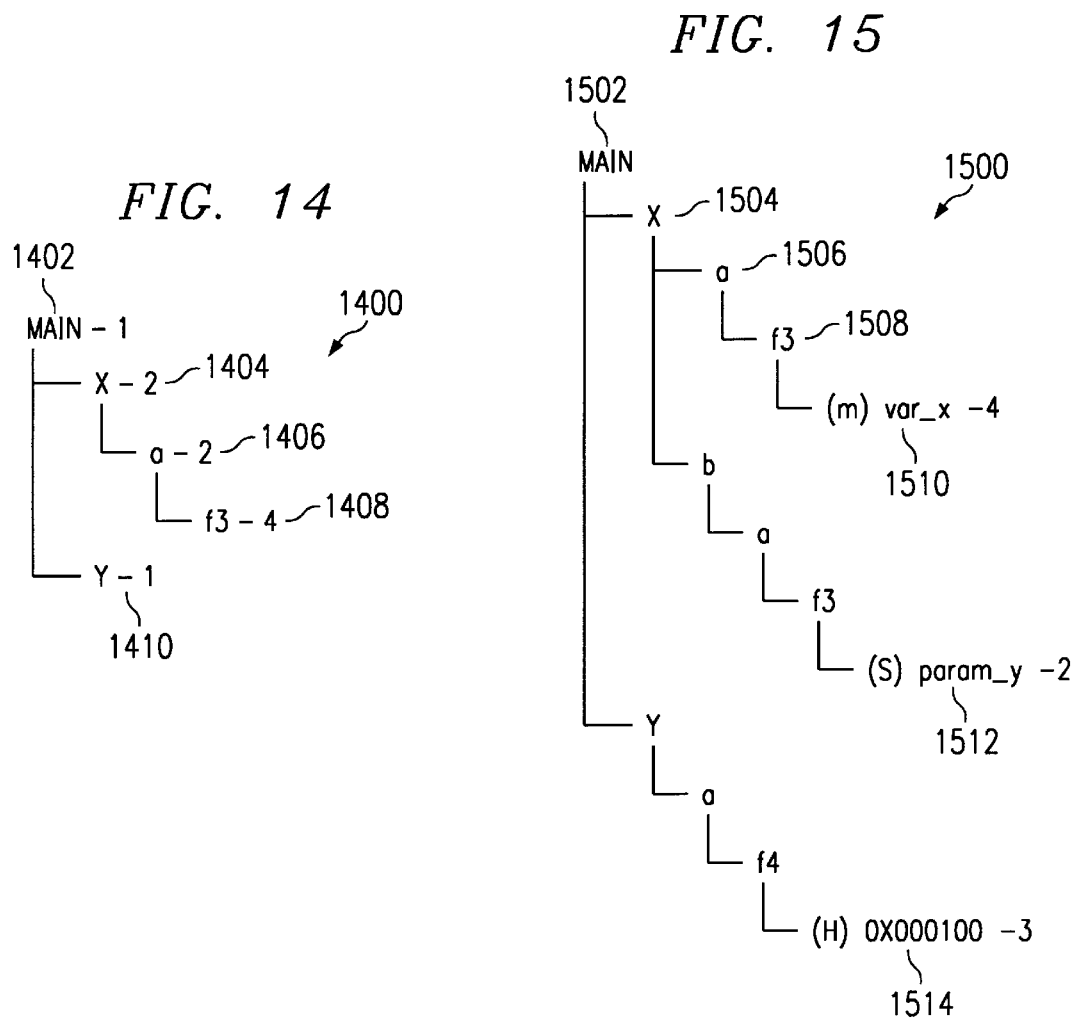

METHOD AND APPARATUS FOR STRUCTURED PROFILING OF DATA PROCESSING SYSTEMS AND APPLICATIONS

CROSS REFERENCE TO RELATED APPLICATION

This application is related to copending and commonly assigned applications entitled "SYSTEM AND METHOD FOR PROVIDING TRACE INFORMATION REDUCTION", application Ser. No. 08/989,725, filed on Dec. 12, 1997, filed even date herewith. The copending applications are incorporated by reference herein.

BACKGROUND OF THE INVENTION

1. Technical Field

The present invention relates generally to improved data processing system, and in particular to an improved method and apparatus for monitoring performance of a data processing system. Still more particularly, present invention provides an improved method and apparatus for structured profiling of the data processing system and applications executing within the data processing system.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool, which keeps track of particular sequences of instructions by logging certain events as they occur. For example, a trace tool may log every entry into and every exit from a module, subroutine, method, function, or system component. Alternately, a trace tool may log the requester and the amounts of memory allocated for each memory allocation request. Typically, a time stamped record is produced for each such event. Pairs of records similar to entry-exit records also are used to trace execution of arbitrary code segments, to record requesting and releasing locks, starting and completing I/O or data transmission, and for many other events of interest.

Another tool used involves program sampling to identify events, such as program hot spots. This technique is based on the idea of interrupting the application or data processing system execution at regular intervals. At each interruption, the program counter of the currently executing thread, a process that is part of a larger process or program, is recorded. Typically, at post processing time, these tools capture values that are resolved against a load map and symbol table information for the data processing system and a profile of where the time is being spent is obtained from this analysis.

Event based profiling has drawbacks. For example, event based profiling is expensive in terms of performance (an event per entry, per exit), which can and often does perturb the resulting view of performance. Additionally, this technique is not always available because it requires the static or dynamic insertion of entry/exit events into the code. This insertion of events is sometimes not possible or is at least, difficult. For example, if source code is unavailable for the to-be-instrumented code, event based profiling may not be feasible.

On the other hand, sample based profiling provides a view of system performance (a "flat view"), but does provide the benefits of reduced cost and reduced dependence on hooking-capability.

Further, sample-based techniques do not identify where the time is spent in many small and seemingly unrelated functions, or in situations where no clear hot spot is apparent. Without an understanding of the program structure, it is not clear with such a "flat" profile how to determine where the performance improvements can be obtained.

Therefore, it would be advantageous to have an improved method and apparatus for profiling data processing systems and the applications executing within the data processing systems.

SUMMARY OF THE INVENTION

It is one object of the present invention to provide an improved data processing system.

It is another object of the present invention to provide an improved method and apparatus for monitoring performance of a data processing system.

It is yet another object of the present invention to provide an improved method and apparatus for structured profiling of the data processing system and applications executing within the data processing system.

The present invention provides a method for monitoring the performance of an entire system with one or more active programs. A periodically occurring event is identified and the call stack associated with the active thread at the time of the event (e.g., a timer interrupt) is obtained. The call stack for the thread is examined to identify each routine currently executing. Each routine in the call stack is represented as a node in an accounting data structure having the organization of a tree.

Additionally, information relating to execution of each thread may be associated with a node used to represent the routine, or some offset within a routine. A report is created that identifies each thread currently executing.

The present invention also provides a method in a data processing system for analyzing memory use in the data processing system. A page fault is initiated each time a memory access occurs. Monitoring is performed to detect a page fault in the data processing system. A call stack associated with the page fault identified in response to detecting the page fault. The call stack is examined to identify each routine executing when the page fault was detected. Also, each routine is represented as a node in the tree structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a diagram of the call stack in accordance with a preferred embodiment of the present invention;

FIG. 4A is a diagram of a trace of all calls;

FIG. 4B depicts a particular timer based sampling of the execution flow depicted in FIG. 4A in accordance with a preferred embodiment of the present invention;

FIG. 10 is a diagram of another type of report that may be produced using the processes of the present invention;

FIG. 13 is a diagram of a memory profile obtained using the processes of the present invention;

FIG. 14 is a sample xtree report for instruction faults in accordance with a preferred embodiment of the present invention; and FIG. 15 is a sample xtree report for data faults in accordance with a preferred embodiment of the present invention.

DETAILED DESCRIPTION OF A PREFERRED EMBODIMENT

Figure 1:
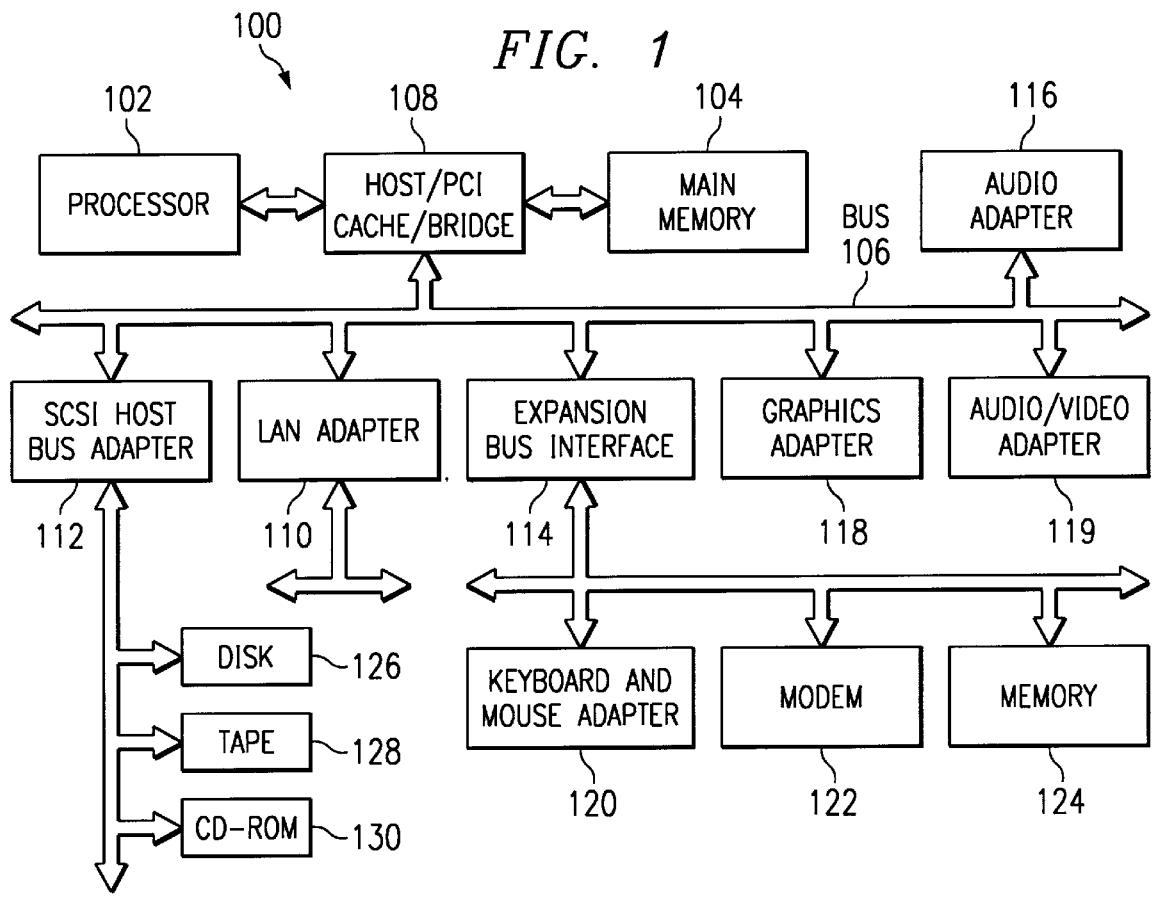
FIG. 1 is a block diagram of a data processing system in which the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the motherboard and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention. For example, the present invention may be implemented on mainframe computers.

The present invention provides a system, method, and computer readable medium for structured profiling of data processing systems and applications executing on the data processing system. The present invention in one implementation obtains information from the stack of an interrupted thread in which the thread is interrupted by a timer interrupt presently available in many operating systems. This timer interrupt is employed to sample information from a call stack. By walking back up the call stack, a complete call stack can be obtained for analysis. This call stack records the sequence of functions/method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB.

Thus, during processing or at post processing, the profile produced reflects a sampling of all possible call stacks, not just leaves of the possible call stacks, as in presently known program counter sampling techniques. Leaves are nodes in the call stack tree structure that are the farthest distance from the root node, also referred to as the primary node. In other words, a leaf is a node at the end of a branch, one that has no descendants. A descendant is a child of a parent node, and a leaf is a node that has no children.

With reference now FIG. 2, a diagram of the call stack is depicted in accordance with a preferred embodiment of the present invention. A "stack" is a region of reserved memory in which a program or programs store status data, such as procedure and function call addresses, passed parameters, and sometimes local variables. A "stack frame" is a portion of a thread's stack that represents local storage (arguments, return addresses return values, local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the "call stack". A call stack represents all not-yet-completed function calls —in other words, it reflects the function invocation sequence at any point in time.

Call stack 200 includes information identifying the routine that is currently running, the routine that invoked it, and so on all the way up to the main program. Call stack 200 includes a number of stack frames 202, 204, 206, and 208. In the depicted example, stack frame 202 is at the top of call stack 200, while stack frame 208 is located at the bottom of call stack 200. The top of the call stack also is referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention and chain all of the frames together. Part of the standard linkage convention also dictates that the function return address be placed just above the invoked-function's stack frame; this can be used to ascertain the address for the invoked function. While this discussion employs an Intel based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 208a in stack frame 208. In turn, EBP 208 points to EBP 208a in stack frame 206, which in turn points to EBP 204a in stack frame 204. In turn, this EBP points to EBP 202a in stack frame 202. Within stack frames 202–208 are EIPs 202b–208b, which identify the calling routine's return address. The routines may be identified from these addresses. Thus, routines are defined by collecting all of the return addresses by walking up or backwards through the stack.

Figure 3:
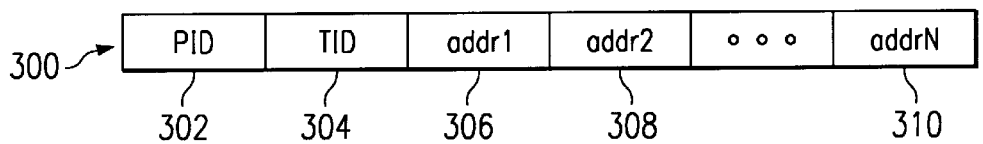
FIG. 3 is illustration of a call stack sample in accordance with a preferred embodiment of the present invention.

With reference to the FIG. 3, an illustration of a call stack sample is depicted in accordance with a preferred embodiment of the present invention. A call stack sample, such as call stack sample 300 is obtained by walking the call stack. A sample is obtained each time a periodic event, such as, for example, a timer interrupt occurs. These samples may be stored for processing later or may be processed while the program continues to execute.

In the depicted example, call stack sample 300 contains a pid 302, which is the process identifier, and a tid 304, which is the thread identifier. Call stack sample 300 also contains addresses addr1 306, addr2 308 . . . addrN 310. In this example, addr1 306 represents the value of the program counter at the time of the interrupt. This address occurs somewhere within the scope of the interrupted function. addr2 308 represents an address within the function that called the function that was interrupted. For Intel processor based data processing systems, it represents the return address for that call; decrementing that value by 4 results in the address of the actual call, also known as the call-site. This corresponds with EIP 208b in FIG. 2. addrN 310 is the top of the call stack (EIP 202b). The call stack sample that would be returned if the timer interrupt interrupted the thread whose call stack state is depicted in FIG. 2 would consist of: a pid, which is the process id of the interrupted thread; a tid, which is the thread id for the interrupted thread; a pcv, which is a program counter value (not shown on FIG. 2) for the interrupted thread; EIP 208b; EIP 206b; EIP 204b; and EIP 202b. In terms of FIG. 3, pcv=addr1, EIP 208b= addr2, EIP 206b=addr3, EIP 204b=addr4, EIP 202b=addr5.

Turning next to FIG. 4A, a diagram of a program execution sequence along with the state of the call stack at each function entry/exit point is provided. The illustration shows entries and exits occurring at regular time intervals—but this is only a simplification for the illustration. If each function (A, B, C, and X in the figure) were instrumented with entry/exit event hooks, then complete accounting of the time spent within and below each function would be readily obtained. Note in FIG. 4A that at time 0, the executing thread is in routine C. The call stack at time 0 is C. At time 1, routine C calls routine A, and the call stack becomes CA and so on. The accounting technique and data structure is described in more detail in a copending and commonly assigned application entitled SYSTEM AND METHOD FOR PROVIDING TRACE INFORMATION REDUCTION", application Ser. No. 08/989,725, filed on Dec. 12, 1997, which allows for complete accounting with this type of instrumentation. Unfortunately, this type of instrumentation can be expensive, introduce bias and in some cases be hard to apply. It is the objective of the present application to alleviate the performance bias (and other complications) that entry/exit hooks produce by sampling the program's call stack.

Consider FIG. 4B, in which the same program is executed, but is being sampled on a regular basis (in the example, the interrupt occurs at a frequency equivalent to two timestamp values). Each sample includes a snapshot of the interrupted thread's call stack. Not all call stack combinations are seen with this technique (note that routine X does not show up at all in the set of call stack samples in FIG. 4B). This is an acceptable limitation of sampling. The idea is that with an appropriate sampling rate (e.g., 30–100 times per second) the call stacks in which most of the time is spent will be identified. It does not really matter if some are left out, provided these are combinations for which little time is consumed.

The performance data associated with the detailed trace and call stack data in FIG. 4 can be represented in a tree format. It is also possible to map the performance data obtained from the sampled call stack data like that illustrated in FIG. 4B into the same kind of tree structure.

Figure 5:
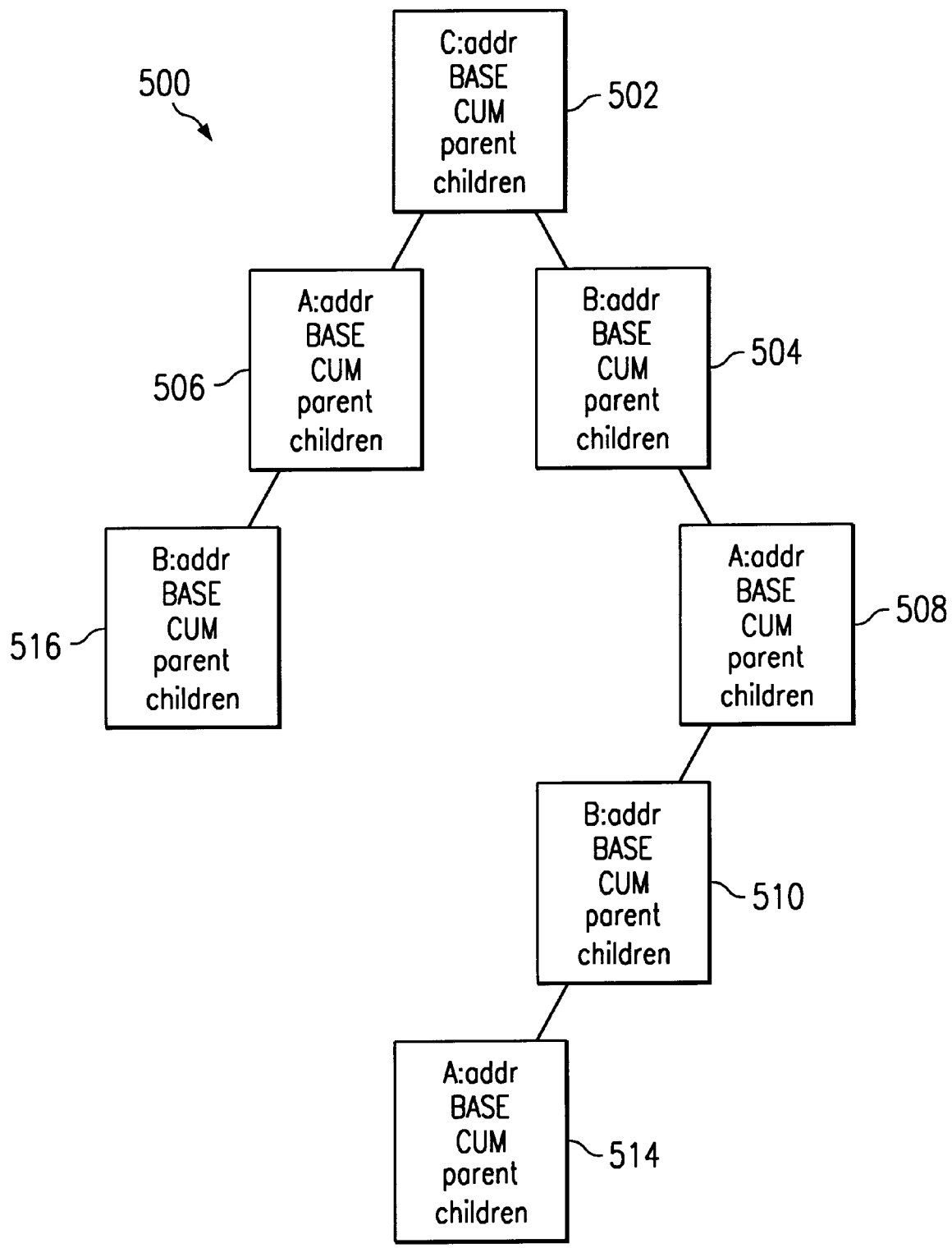
FIG. 5 is a diagram of a tree in accordance with a preferred embodiment of the present invention.

Turning now to FIG. 5, a diagram of a tree structure generated from sampling a call stack is depicted in accordance with a preferred embodiment of the present invention. This figure illustrates a call stack tree 500 in which each node in tree structure 500 represents a function entry point. Additionally, in each node in tree structure 500, a number of statistics are recorded. In the depicted example, each node, nodes 502–508, contains an address (addr), a base time (BASE), cumulative time (CUM) and parent and children pointers. The address represents a function entry point. The base time represents the amount time consumed directly by this thread executing this function. The cumulative time is the amount of time consumed by this thread executing this function and all functions below it on the call stack. In the depicted example, pointers are included for each node. One pointer is a parent pointer, a pointer to the node's parent. Each node also contains a pointer to each child of the node.

Those of ordinary skill art will appreciate that tree structure 500 may be implemented in a variety of ways and that many different types of statistics may be maintained at the nodes other than those in the depicted example. In addition, other pointers may be stored within the nodes to further aid subsequent analysis. Further, other structural elements, such as tables for properties of the routine, such as, for example, the name of the routine, also may be stored within a node. In addition, the nodes in the tree structure also may be associated with functions plus offsets. The call stack is developed from looking back at all return addresses. These return addresses will resolve within the bodies of those functions at specific offsets. This information allows for accounting discrimination between distinct invocations of the same function. In other words, if function X has 2 distinct calls to function A, the time associated with those calls can be accounted for separately.

Figure 6:
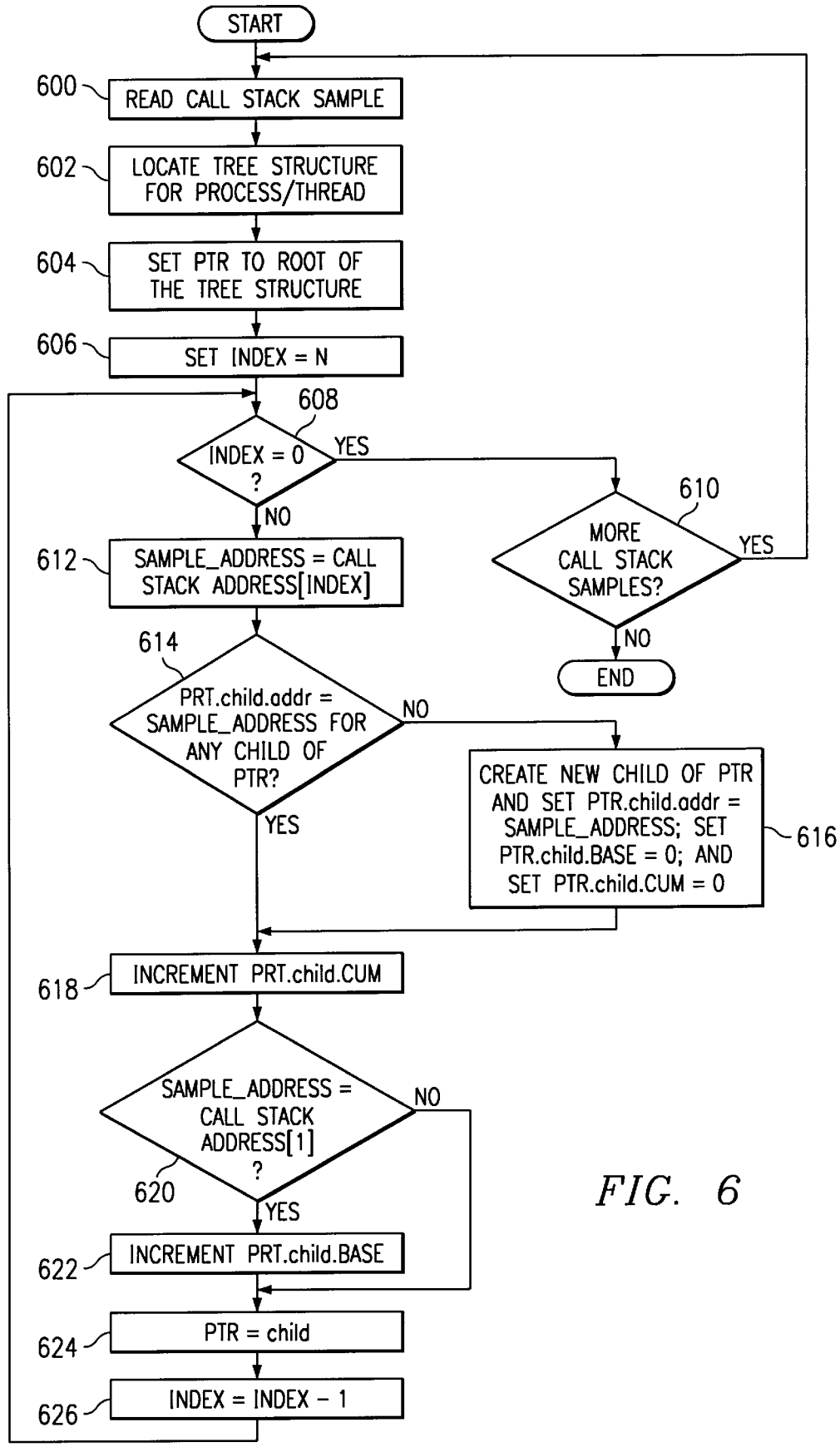
FIG. 6 is a flowchart of a process for creating a call stack tree in accordance with a preferred embodiment of the present invention.

Turning now to FIG. 6, a flowchart of a process for creating a call stack tree structure is depicted in accordance with a preferred embodiment of the present invention. The process begins by reading a call stack sample (step 600). This step samples the call stack to determine what routines are executing when the timer interrupt occurs. Unlike systems requiring entry and exit hooks, the present invention avoids, through the call stack, the need for adding additional instructions to the programs, which also affect the performance and time spent in routines. Next, the tree structure for this process/thread (pid, tid) is located (step 602). Then, the pointer (PTR) is set to the root of this tree structure by setting PTR=root(pid, tid) (step 604). The index is set equal to N, which is the number of entries in the call stack sample (step 606).

A determination is made as to whether index is equal to zero (step 608). If the index is equal to zero, the process then returns to determine whether additional call stack samples are present for processing (step 610). If additional call stack samples are present, the process then returns to step 600 to read another call stack sample. Otherwise, the process terminates.

On the other hand, the index is not equal to zero, process and then sets the sample address, sample_address, equal to the call stack address, call stack address[index] (step 612). Next, a determination is made as to whether PTR.child.addr=sample_address for any child of PTR (step 614). In other words, this step determines whether the sample address has ever been seen at this level in the tree structure. If the address has never been seen at this level in the tree structure, a new child of PTR is created and the PTR.child.addr is set equal to the sample address, sample_address, the variable PTR.child.BASE for the node is set equal to zero, and the variable PTR.child.CUM for the node is set equal to zero (step 616). Thereafter, the cumulative time for the node is incremented by incrementing the variable PTR.child.CUM (step 618). The process also proceeds to step 618 from step 614 if the address has been seen at this level. Next, a determination is made as to whether the sample address, sample_address, is equal the last address in the call stack sample, call stack address[1] (step 620). If the sample address is equal to the address being processed, the base time for the node is incremented by incrementing the variable PTR.child.BASE (step 622). The pointer PTR is then set equal to the child (step 624), and the index is decremented (step 626) with the process then returning to step 608 as previously described. With reference again to step 620, if the sample address is not equal to the address being processed, the process then proceeds to step 624.

In the depicted example in FIG. 6, the process is used to process call stack samples recorded during execution of a program. The illustrated process also may be implemented to process call stack samples dynamically during execution of a program. For example, step 610 may be modified to wait until the next timer interrupt occurs, and then continue to loop back to step 610 at the next interrupt.

Figures 7, 8, 9:
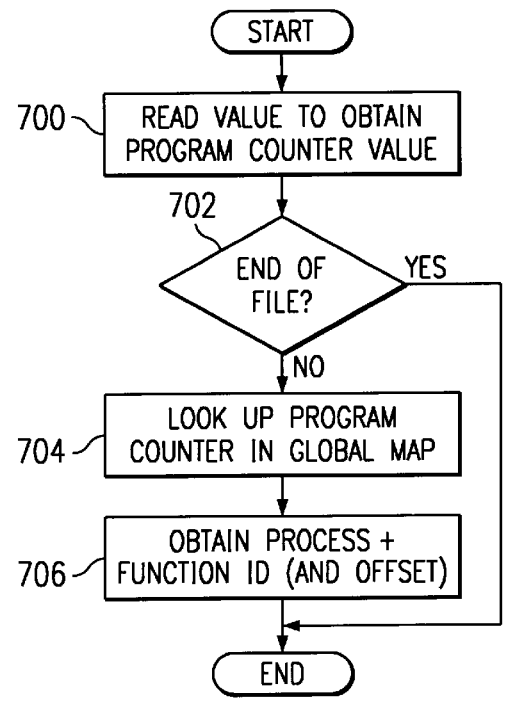
FIG. 7 is a flowchart of a process for identifying functions from an address obtained during sampling is depicted in accordance with a preferred embodiment of the present invention.
FIG. 8 is a diagram of a structured profile obtained using the processes of the present invention.
FIG. 9 is a diagram of a record generated using the processes of present invention.

The addresses obtained during sampling are used to identify functions. The functions are identified by mapping these addresses into functions plus offsets. Turning next to FIG. 7, a flowchart of a process for identifying functions from an address obtained during sampling is depicted in accordance with a preferred embodiment of the present invention. The process begins by reading a program counter value that is obtained during sampling of the call stack. (step 700). A determination is made as to whether the end of file has been reached (step 702). If the end of the file has not been reached, the program counter value is looked up in a global map (step 704). A global map in the depicted example is a map of system and per process symbols that is generated from system loader information and application, library, and system symbol tables. A process plus function id (and offset) is obtained from the global map in response to looking up the program counter value (step 706). Thereafter, the process returns to step 700. In this manner, a function plus offset pair may be derived from an address.

The function plus offset pair information may be used in generating reports, such as those described below. The process in FIG. 7 also may be used during execution of a program that is sampled.

With reference to the FIG. 8, a diagram of a structured profile obtained using the processes of the present invention is illustrated. Profile 800 shows sample numbers in column 802. Column 804 shows the call stack with an identification of the functions present within the call stack at different sample times.

Next in FIG. 9, a diagram of a record generated using the processes of present invention is depicted. Each routine in records 900 is listed separately, along with information regarding the routine in FIG. 9. For example, Sample column 902 identifies the sample number. Next, Calls column 904 lists the number of times each routine has been called. BASE column 906 contains the total time spent in the routine, while CUM column 808 includes the cumulative time spent in the routine and all routines called by the routine. Name column 910 contains the name of the routine.

In FIG. 10, a diagram of another type of report that may be produced is depicted in accordance with a preferred embodiment of the present invention. The report depicted in FIG. 10 illustrates much of the same information found in FIG. 9, but in a slightly different format. As with FIG. 9, diagram 1000 includes information on calls, base time, and cumulative time.

The depicted example illustrated in FIGS. 2 through 10 illustrated a process for structured profiling of data processing systems and applications executing on a data processing system. The depicted example in these figures is directed towards obtaining information from a stack in response to an occurrence of a timer interrupt. The processes of the present invention also may be applied to other types of events occurring within a data processing system or application. For example, in another embodiment of the present invention, the processes described may be applied to memory analysis. Instead of employing a timer interrupt, a page fault interrupt may be used as a signal to gather data from the stack. In the depicted example, a page fault is forced each time a memory access occurs within the data processing system. A page fault also may be selectively triggered, depending on processing resources. For example, a page fault may be triggered each time a new or different page is accessed, each time a new data page is accessed, or each time an instruction page is accessed. Thus, a page fault may be initiated each time a selected type of memory access occurs. A selected type of memory access as used herein may range from every memory access to selected ones, such as, for example, a new or different page access. The forcing of a page fault may be accomplished through various known mechanisms, such as reducing the number of physical page frames in the system to a smaller number of physical page frames. For example, the number of page frames may be reduced to some number above the minimum required by the architecture of the data processing system. When a page fault occurs, a page fault address and a page fault instruction address may be obtained. From this information, the processes of the present invention as described above and additional processes as described below may be employed to analyze memory usage.

In particular, the call stack, such as the call stack in FIG. 2, is examined and a tree structure, such as tree structure 500 in FIG. 5, is created using the process described in FIG. 6. Instead of base time and cumulative time, a base number of memory access and a cumulative number of accesses are tracked in memory analysis. As a result, BASE is the number of times that the memory access was caused directly by a particular thread executing a particular function while CUM is the cumulative number of memory accesses by the thread executing a particular function and all functions below it on the call stack.

Figure 11:
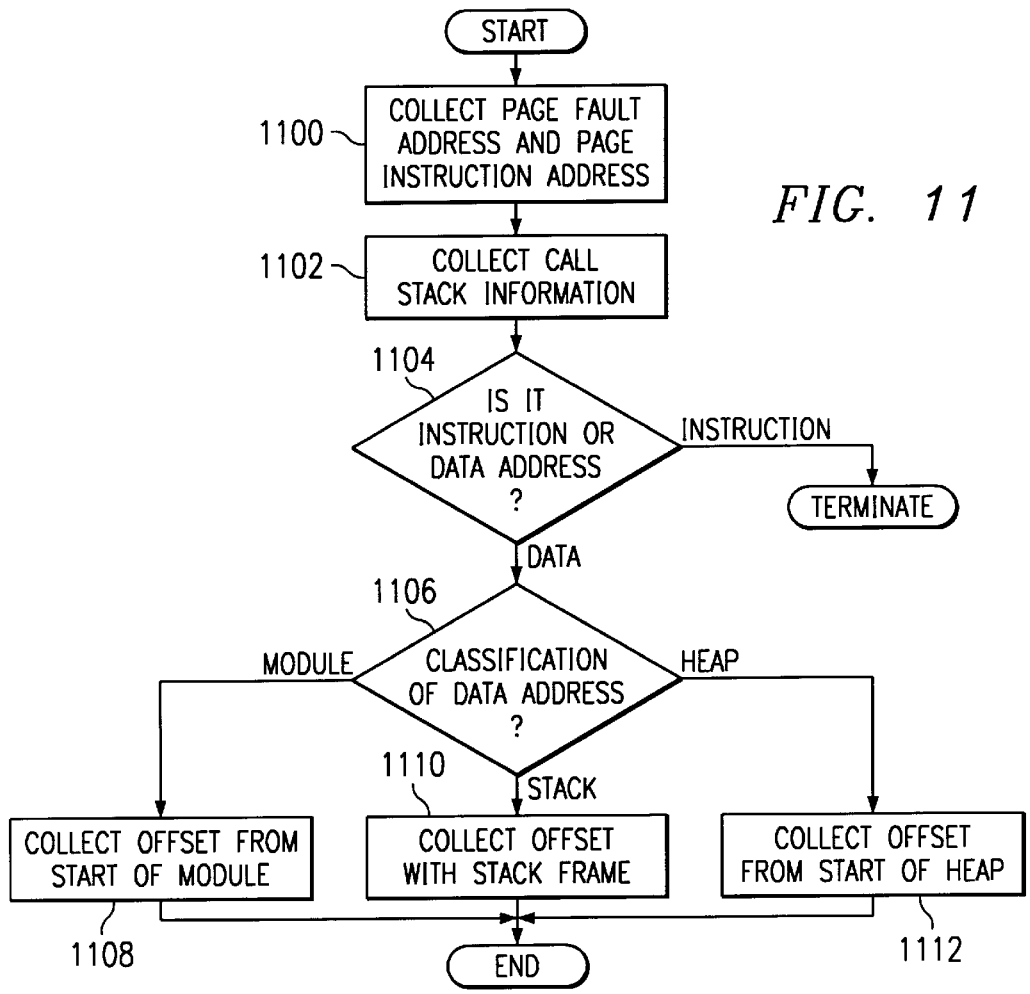
FIG. 11 is a flowchart of a process for analyzing memory accesses in accordance with a preferred embodiment of the present invention.

With reference now to FIG. 11, a flowchart of a process for analyzing memory accesses is depicted in accordance with a preferred embodiment of the present invention. The process begins by collecting the page fault address and the page fault instruction address (step 1100), and information is collected from the call stack (step 1102). Next, a determination is made as to whether the page fault is an instruction fault or a data fault by determining whether the address is an instruction address or a data address (step 1104). If the page fault address and the page fault instruction address are the same, then the page fault is an instruction fault. Otherwise, the page fault is a data fault. If the address is an instruction address, the process then terminates.

If the fault is a data fault, the process then classifies the data address as either being a module address, stack address or a heap address (step 1106). If the address is a module address, some module identification information is collected along with the offset from the start of the module (step 1108) with the process terminating thereafter. Upon classifying the data address as a stack address, the offset from within the stack frame is collected (step 1110) with the process terminating thereafter. Classification of the data address as a heap address results in the offset from the start of the heap being collected (step 1112) with the process terminating thereafter.

Figure 12:
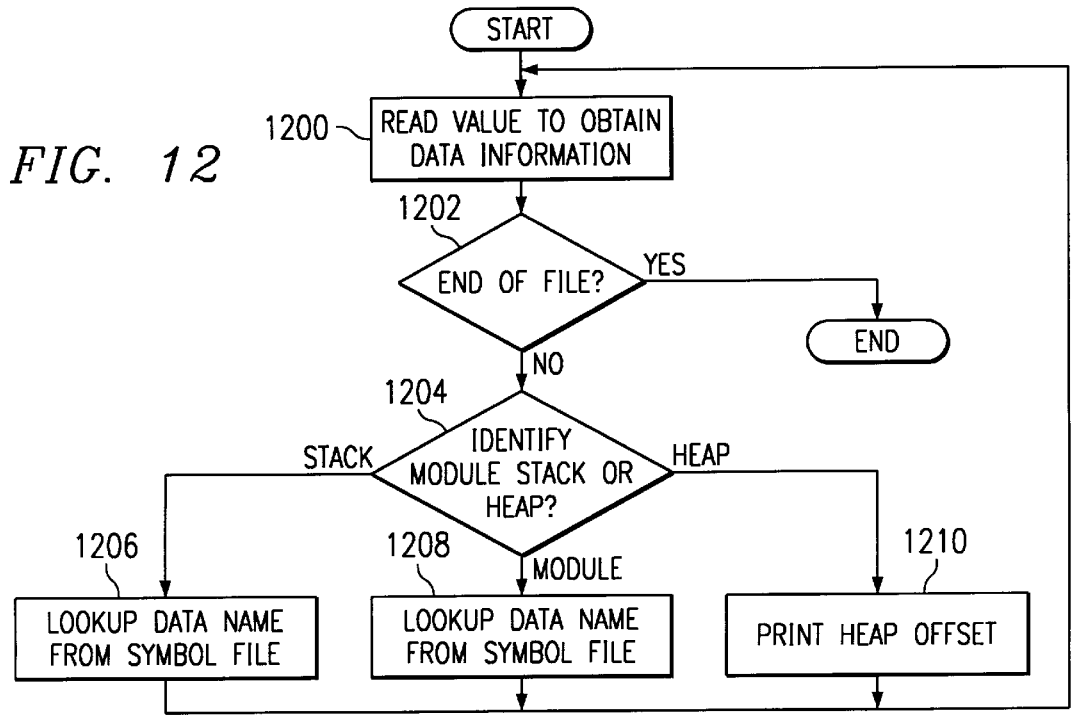
FIG. 12 is a flowchart of a process for identifying functions from addresses obtained in response to a page fault in accordance with a preferred embodiment of the present invention.

With reference now to FIG. 12, a flowchart of a process for identifying functions from addresses obtained in response to a page fault is depicted in accordance with a preferred embodiment of the present invention. The processes illustrated in FIG. 12 are processes that may be executed in a post processing fashion. These processes are used in conjunction with those illustrated in FIG. 7 to obtain information for memory analysis. The processes in FIG. 12 are used to analyze various types of data addresses while the processes in FIG. 7 are used in memory analysis to obtain information from the call stack in response to an occurrence of a page fault.

The process begins in FIG. 12 by reading a value to obtain data information from a file (step 1200). A determination is made as to whether the end of the file has been reached (step 1202). If the end of the file has been reached, the process terminates. Otherwise, a determination is made to identify the type of data (step 1204). If the data is from a stack, the data name is looked up from a symbol file (step 1206) with the process then returning to step 1200. If the data is that from a module, the data name also is looked up from a symbol file (step 1208) with the process returning to step 1200. In response to identifying that the data is from a heap, the heap and the offset are printed or placed into a report (step 1210) with the process then returning to step 1200.

In memory analysis, the processes illustrated in FIGS. 7 and 12 may be executed during processing described in FIG. 6 rather than in post processing. Concurrent processing is typically performed only if the time cost for executing the processes in FIGS. 7 and 12 during the execution of processes in FIG. 6 does not outweigh the benefits of concurrent processing.

With reference now to FIG. 13, a diagram of a memory profile obtained using the processes of the present invention is illustrated. Profile 1300 shows a portion of samples collected during analysis of a program or data processing system. Sample number column 1302 identifies the sample number, which represents a memory access indicated by a page fault. Data column 1304 illustrates the data collected in response to a page fault. In profile 1300, samples 1 and 3 are instruction faults. Sample 2 is a data fault from a module. In data column 1304 for sample 2, 0x0005 is the module information while 0x00000008 is the offset. Sample 4 in profile 1300 is a data fault from a stack. In sample 4, 0x00000004 is the offset within the stack. Information about function f4( ) allows one to identify the function name corresponding to the offset. Sample 5 in profile 1300 is a data fault from a heap. 0x00000100 in data column 1304 is the offset within the heap.

With reference now to FIG. 14, a sample xtree report for instruction faults is depicted in accordance with a preferred embodiment of the present invention. An xtree report is a tree view of a report, such as the report illustrated in FIG. 10. In xtree report 1400, lines 1402, 1404, 1406 and 1408 represent sample 1 in profile 1300 from FIG. 13. Each line includes an identifier of the function and a number of accesses by the function. For example, in line 1408, the function is f3( ) and the number of accesses is four while in line 1406, the name of the function is A and the number of accesses is two. Line 1410 represents sample 2 in profile 1300 in FIG. 13. In FIG. 14, X( ) in line 1404 and Y( ) in line 1410 are children of Main( ) in line 1402. In line 1406, a( ) is a child of X( ) while f3( ) in line 1408 is a child of a( ).

Turning next to FIG. 15, a sample xtree report for data faults is depicted in accordance with a preferred embodiment of the present invention. In xtree report 1500, lines 1502, 1504, 1506, 1508 and 1510 represent sample 4 from profile 1300 in FIG. 13. In line 1510, (m) indicates that variable var_x is a module variable while the numeral 4 indicates that this module variable has been accessed four times. In line 1512, (s) indicates that param_y was on the stack (as a passed parameter or a local variable) with the numeral 2 indicating that this variable has been accessed two times. In line 1514, (h) indicates that the information is from a heap in which the offset 0x000100 has been accessed three times as indicated by the numeral 3. In the depicted examples, the functions are no longer leaf nodes as with timer sampling. Instead, the variables form the leaf nodes. For example, in line 1510, var_x is the leaf node instead of the function f3( ).

Thus, the present invention provides an improved method and apparatus for structured profiling of data processing systems and applications executing on those data processing systems. This advantage is provided by program sampling that contains information from the call stack and provides a profile, reflecting the sampling of entire call stack, not just the leaves. Furthermore, the present invention also may be applied to other types of stacks. For example, with Java programs, a large amount of time is spent in a subroutine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disk, a hard disk drive, a RAM, and CD-ROMs and transmission-type media such as digital and analog communications links.

The description of the present invention has been presented for purposes of illustration and description, but is not intended to be exhaustive nor limited to the invention in the form disclosed. Many modifications and variations will be apparent to those of ordinary skill in the art. For example, although the depicted examples employ timer interrupts, other interrupts may be used to trigger the described sampling mechanism. The embodiment was chosen and described in order to best explain the principles of the invention the practical application to enable others of ordinary skill in the art to understand the invention for various embodiments with various modifications as are suited to the particular use contemplated.

What is claimed is:

1. A method for monitoring performance of a program, the method comprising:

detecting an occurrence of a selected event;

identifying a call stack associated with the program in response to a detection of the selected event;

examining the call stack to identify each routine that is currently executing in association with the program; and representing each routine as a node in tree structure.

2. The method of claim 1 further comprising:

associating information relating to execution of each routine with a node used to represent the routine.

3. The method of claim 1, wherein the information relating to execution comprises function name plus offset.

4. The method of claim 1 further comprising:

creating a report identifying each routing currently executing.

5. The method of claim 4, wherein the step of creating occurs each time a call stack is examined.

6. The method of claim 4, wherein the step of creating occurs after execution of the program is terminated.

7. The method of claim 4, wherein the report is in a format of a tree structure.

8. The method of claim 1, wherein the selected is an event timer.

9. The method of claim 1, wherein the step of examining the call stack comprises:

reading the call stack, wherein the call stack is a list of routines being executed when the periodically occurring event occurs;

determining whether a selected routine is found within the tree structure; and adding a new node to the tree structure for the address in response to a determination that the selected routine is absent from the tree structure, wherein the new node is a child node descending from a parent node representing another address.

10. The method of claim 9, wherein the list of routines is a plurality of addresses, wherein each address within the plurality of addresses identifies an entry point, or other offset within a routine.

11. A data processing system for monitoring performance of a program, the data processing system comprising:

detection means for detecting selected event;

identification means for identifying a call stack associated with the program in response to a detection of the selected event;

examination means for examining the call stack to identify each routine that is currently executing in association with the program; and representation means for representing each routine as a node in tree structure.

12. The data processing system of claim 11 further comprising:

association means for associating information relating to execution of each routine with a node used to represent the routine.

13. The data processing system of claim 11 further comprising:

creation means for creating a report identifying each routing currently executing.

14. The data processing system of claim 13, wherein the creation means is activated each time a call stack is examined.

15. The data processing system of claim 13, wherein the creation means is activated after execution of the program is terminated.

16. The data processing system of claim 13, wherein the report is in a format of a tree structure.

17. The data processing system of claim 11, wherein the selected event is an event timer.

18. The data processing system of claim 17, wherein the list of routines is a plurality of addresses, wherein each address within the plurality of addresses identifies an entry point for a routine.

19. The data processing system of claim 11, wherein the examination means comprises:

reading means for reading the call stack, wherein the call stack is a list of routines being executed when the periodically occurring event occurs;

determination means for determining whether a selected routine is found within the tree structure; and addition means for adding a new node to the tree structure for the address in response to a determination that the selected routine is absent from the tree structure, wherein the new node is a child node descending from a parent node representing another address.

20. A computer program product for use with a data processing system for monitoring performance of a program, the computer program product comprising:

first instructions for detecting a periodically occurring event;

second instructions for identifying a call stack associated with the program in response to a detection of the periodically occurring event;

third instructions for examining the call stack to identify each routine that is currently executing in association with the program; and fourth instructions for representing each routine as a node in tree structure.

21. The computer program product of claim 20, further comprising:

fifth instructions for associating information relating to execution of each routine with a node used to represent the routine.

22. The computer program product of claim 20, further comprising:

fifth instructions for creating a report identifying each routine currently executing.

23. The computer program product of claim 20, wherein the third instructions for examining the call stack comprises:

instructions for reading the call stack, wherein the call stack is a list of routines being executed when the periodically occurring event occurs;

instructions for determining whether a selected routine is found within the tree structure; and instructions for adding a new node to the tree structure for the address in response to a determination that the selected routine is absent from the tree structure, wherein the new node is a child node descending from a parent node representing another address.

* * * * *